Dec. 23, 1969     TZUO-CHANG LEE     3,485,553

ELECTRO-OPTIC LIGHT BEAM DEFLECTOR

Filed Sept. 19, 1967     2 Sheets-Sheet 1

*INVENTOR.*
TZUO-CHANG LEE
BY
ATTORNEY.

Dec. 23, 1969  TZUO-CHANG LEE  3,485,553
ELECTRO-OPTIC LIGHT BEAM DEFLECTOR
Filed Sept. 19, 1967  2 Sheets-Sheet 2

INVENTOR.
TZUO-CHANG LEE
BY *Oliver F. Gnett*
ATTORNEY.

3,485,553
ELECTRO-OPTIC LIGHT BEAM DEFLECTOR
Tzuo-Chang Lee, Eden Prairie, Minn., assignor to Honeywell Inc., Minneapolis, Minn., a corporation of Delaware
Filed Sept. 19, 1967, Ser. No. 668,912
Int. Cl. G02f 1/28, 1/36, 1/26
U.S. Cl. 350—160                      14 Claims

ABSTRACT OF THE DISCLOSURE

An electro-optic (E–O) light beam deflector in the form of a 45° right triangular composite prism formed by either two smaller right triangular prisms or by two right triangular prisms and a parallelepiped. Deflection occurs whenever the light beam crosses a boundary. Light reflection means are provided to direct the light beam along a predetermined path. An array of deflectors to achieve cumulative deflection and a two-dimensional deflection system is also disclosed.

BACKGROUND OF THE INVENTION

This invention relates to a light deflector for controlling the position of a light beam in an analog manner. Light deflectors have previously achieved deflection by passing a light beam through a boundary formed by electro-optic (E–O) material having different electric field dependent indices of refraction. Refinements to this basic principle provide reflective means for passing a light beam through the boundary a plurality of times and arrangements to achieve cumulative deflection. In general, deflectors having a boundary formed by two different E–O materials are in the form of a parallelepiped. In no case is optimum use made of the electro-optic crystal. That is, the number of resolvable spots and total deflection angle is not maximized for a given volume of crystal. This is a severe disadvantage since the expense of the electro-optical material is predominant in a light deflection system.

SUMMARY OF THE INVENTION

The light beam deflector of the present invention achieves deflection by the passage of a light beam through at least one boundary within a triangular composite prism. The boundary is formed by adjacent E–O polyhedrons having different electric field dependent indices of refraction. The adjacent polyhedrons can be material having different E–O characteristics, the same E–O material arranged such that the crystallographic c-axes of adjacent polyhedrons are oppositely oriented or the same E–O material provided with separate means to apply an electric field. A reflective coating along at least one side of the composite prism insures that a light beam will traverse a boundary within the composite prism. As the light beam passes through a boundary, an increment of deflection occurs proportional to the electric field applied. In one preferred embodiment the adjacent polyhedrons are two right triangular prisms. In a second preferred embodiment the polyhedrons are two right triangular prisms and a parallelepiped.

The major advantage of the present invention is the obtainment of the same number of resolvable spots and total deflection angle as in the prior art while using a substantially reduced volume of crystal. The reduction in crystal volume is a significant economical advancement in electro-optic light beam deflection systems.

BRIEF DESCRIPTION OF THE DRAWINGS

For a better understanding of the invention, reference should be had to the accompanying drawing wherein.

DESCRIPTION OF THE PREFERRED EMBODIMENTS

Figure 1:
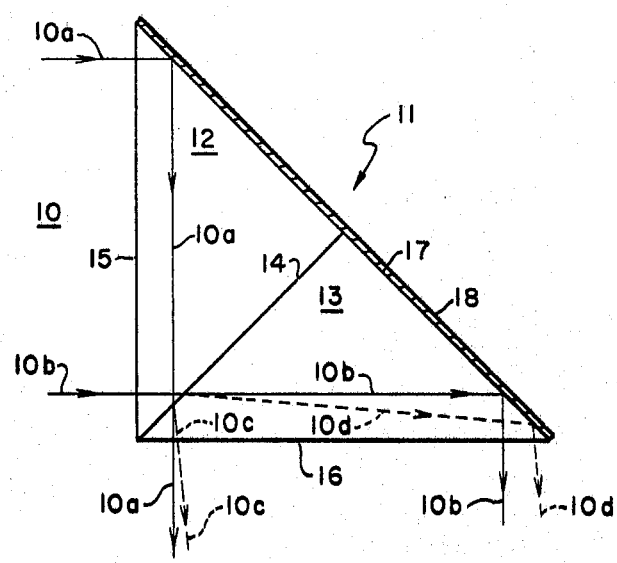
FIGURE 1 is a diagrammatic view of the simplest form of a first embodiment.

Referring to the drawing and more particularly to FIGURE 1 wherein the simplest embodiment of the present invention is shown. The embodiment comprises a 45° right triangular composite prism, generally designated as 11, composed of two adjacent polyhedrons in the form of right triangular prisms 12 and 13.

Figure 2:
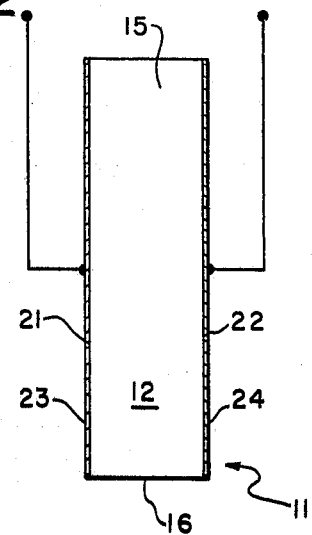
FIGURE 2 is a diagrammatic view of the front face of the prism shown in FIGURE 1.

In the embodiments illustrated (FIGURES 1–6), all the polyhedrons are composed of the same E–O material but are arranged such that the crystallographic c-axes of adjacent polyhedrons are oppositely oriented. The c-axes of the polyhedrons are oriented perpendicular to the plane of the drawing. Thus, in FIGURE 1, if the c-axis of prism 12 is out of the drawing, then the c-axis of prism 13 is into the drawing. A single electric field applied along the c-axis in a manner such as shown in FIGURE 2 will change the indices of refraction of both prisms. That is, when an electric field is applied, the original index of refraction $N_0$ becomes $N_0 + \Delta N$ for prism 12 and $N_0 = \Delta N$ for prism 13; where $\Delta N$ can be either positive or negative. The polyhedrons could also be composed of different E–O material or by E–O material without a crystallographic c-axis if means to apply the proper electric field is provided.

For the illustrated embodiments, the polarization of the incident light beam, generally designated as 10, must be along the c-axis. Light beam 10 is composed of numerous light rays, where rays 10a and 10b are the two extreme rays bounding the beam in the plane of deflection.

The angle $\phi$, through which light beam 10 is deflected at the boundary 14, can be found by applying Snell's law which shows to a first order approximation that the deflection angle $$\phi = \frac{\Delta N}{N} \cdot \frac{L}{W}$$

It then can be shown to a first order approximation that the number of resolvable spots, $N_R$, is:

$$N_R = \frac{W_1}{W} \cdot \frac{L \Delta N}{\lambda}$$

where:

N: Refractive index of the E–O material
$W_1$: Beam width inside the composite prism
$\Delta N$: Difference in the refractive index of two adjacent polyhedrons
$\lambda$: Optical wave length in vacuum of incident light
W: Aperture width of the prism
L: Path length of beam inside composite prism.

These equations can be rewritten in a more illustrative form since $$\frac{W_1}{W} \cdot L, \Delta N$$

represents the optical path difference (O.P.D.) between the two extreme rays 10a and 10b. The deflection can then be considered as a tilt of the wave front caused by an optical phase difference. The preceding equations may now be written:

$$\phi = \frac{O.P.D.}{NW_1} \text{ and } N_R = \frac{O.P.D.}{\lambda}$$

Thus to achieve the most efficient light beam deflector, the ratio of optical path difference to crystal volume must be maximized. The embodiment shown in FIGURE 1 is basic to a light beam deflector which optimizes light beam deflection by reducing the volume of crystal previously necessary to maintain a given optical path difference.

In the preferred manner of operation, properly polarized light beam 10 is incident normal to first face 15 of composite prism 11. Following extreme light rays 10a and 10b through the composite prism will exemplify the principle of operation of the basic structure. Light ray 10a is incident upon first face 15 and traverses prism 12 to second face 17 intercepting it at a 45° angle. Face 17 has a reflective coating 18 which directs light ray 10a normal to third face 16 of composite prism 11. If no electric field is applied, prisms 12 and 13 have similar indices of refraction and deflection will not occur at boundary 14. Light ray 10a exits the composite prism normal to face 16. Light ray 10b traverses the prism in a similar manner. The case in which no electric field is applied will hereinafter be refered to as the undeflected state.

However, if an electric field is applied to at least one prism, rays 10a and 10b will be deflected at boundary 14. After deflection, rays 10a and 10b are illustrated as reflective rays 10c and 10d, respectively. With an electric field applied, the path of ray 10a is substantially in prism 12 which has a first index of refraction and the path of ray 10b is substantially in prism 13 which has a second index of refraction. Thus, the O.P.D. between the two extreme rays is maximized. As previously shown, maximization of the O.P.D. maximizes the number of resolvable spots obtainable and also the total deflection angle obtainable for a given beam width inside the prism.

FIGURE 2 is a schematic view of the front face 15 of composite prism 11 shown in FIGURE 1. This view illustrates parallel first and second bases 21 and 22. An electric field is applied perpendicular to these bases by electrodes 23 and 24. As shown, electrodes 23 and 24 apply an electric field to both prisms 12 and 13. However, electrodes 23 and 24 need only make contact with one prism to make the deflector operational. Also, two pair of electrodes could be provided to apply separate electric fields to prisms 12 and 13. For example, if prisms 12 and 13 are composed of material possessing a quadratic E-O effect, such as lead magnesium niobate $$(Pb_3MgNb_2O_9),$$

separate electrodes would normally be provided to enable a voltage of opposite polarity to be applied to prisms 12 and 13. Then, a linear relationship between the light beam deflection angle and a square root field $$(+\sqrt{1+E1}$$

applied to one prism and $$-\sqrt{1-E1}$$

applied to the other prism) is achieved. Alternatively, a linear relationship is achieved between the light beam deflection angle and a small electric field superimposed on a large biasing field. The biasing field in such a case is of one polarity for the first prism and an opposite polarity for the second prism.

Figure 3:
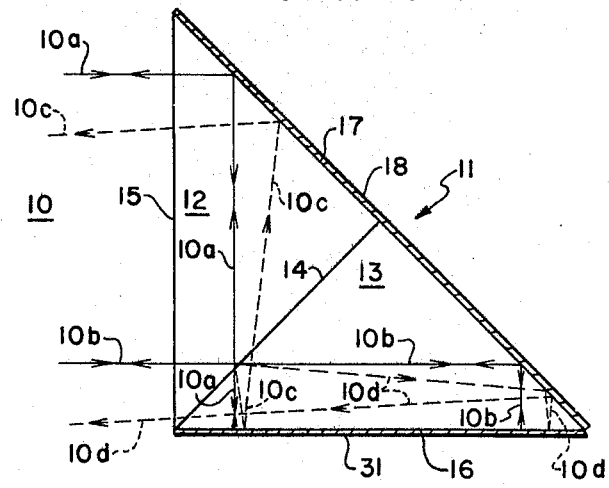
FIGURE 3 is a diagrammatic view of a preferred form for the first embodiment.

In FIGURE 3 an embodiment similar to that shown in FIGURE 1 is illustrated except for the addition of reflective coating 31 on face 16. The addition of reflective coating 31 doubles the path length of incident light beam 10 within the composite prism. The doubling of the path length doubles the O.P.D. between the two extreme rays 10a and 10b. Thus, the number of resolvable spots and total deflection angle is also doubled. To obtain the same O.P.D. as the embodiment of FIGURE 3, the prior art has used a composite parallelpiped having twice the volume of the illustrated composite prism. Hence, FIGURE 3 illustrates a preferred structure capable of achieving the same number of resolvable spots and total deflection angle using only one-half the volume of crystal previously used.

In FIGURE 3 the two extreme rays 10a and 10b of light beam 10 are illustrated both in an undeflected and in a deflected state. In the undeflected state, light ray 10a is incident normal to face 15, traverses the prism o face 17, intercepting it at a 45° angle. Reflective coating 18 on face 17 reflects ray 10a in a direction normal to face 16. Ray 10a now crosses boundary 14, but without an applied electric field, deflection does not occur. Ray 10a then intercepts face 16 perpendicularly and is reflected by reflective coating 31 back upon itself. Following its original path, ray 10a exits composite prism 11 through face 15. Similarly, in the undeflected state, light ray 10b traverses boundary 14 with no deflection occurring, is incident upon face 17, and is redirected by reflective coating 18 in a normal direction to face 16. Intercepting face 16 perpendicularly, ray 10b is reflected back upon its original path and leaves composite prism 11 through face 15.

When an electric field is applied, deflection occurs as light beam 10 crosses boundary 14. Light ray 10a enters composite prism 11 through face 15 and traverses the prism to face 17 where it is reflected in a normal direction to face 16. Light ray 10a is deflected as it crosses boundary 14 and is shown at dotted ray 10c. The increment of deflection causes light ray 10c to intercept face 16 at a direction other than normal.. Reflective coating 31 then redirects light ray 10c toward face 17. At the point where light ray 10c intercepts reflective coating 31 and is redirected, the angle of incidence equals the angle of reflection. As ray 10c traverses the prism 13 toward face 17, it again crosses boundary 14, and another increment of deflection occurs. Light ray 10c then strikes face 17 and is redirected by reflective coating 18 toward face 15. Light ray 10c then exits the composite prims through face 15 along a path different from its incident path. In a similar manner, light ray 10b enters composite prism 11 through face 15 and traverses prism 12 to boundary 14 where an increment of deflection occurs. Deflected ray 10b is then represented as the dotted line 10d. Ray 10d intercepts face 17 at an angle other than 45° and is now directed toward face 16 in a direction other than normal. Ray 10d is then redirected at face 16 by reflective coating 31 back toward face 17. Reflective coating 18 on face 17 redirects light ray 10d toward face 15 where it exits the composite prism along a path different from its incident path after again being deflected at boundary 14. In traversing the composite prism, the path of light ray 10a has substantially one index of refraction while the path of light ray 10b has substantially another index of refraction. Thus, the O.P.D. between the two extreme rays is maximized.

Figure 4:
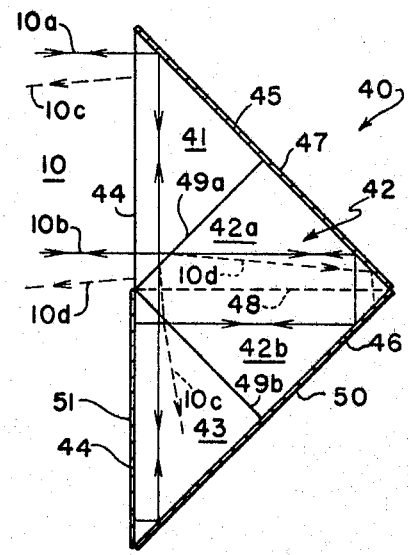
FIGURE 4 is a diagrammatic view of the preferred form of a second embodiment.

FIGURE 4 illustrates the preferred embodiment of a second deflection unit. A use for this embodiment is in an array to achieve cumulative deflection. The 45° right triangular composite prism, generally designated as 40, is composed of a plurality of adjacent polyhedrons. The polyhedrons may be right triangular prisms 41, 42a, 42b, and 43 or they may be two right triangular prisms 41 and 43 and a rectangular parallelepiped, generally designated as 42, where the boundary indicated by dotted line 48 between right triangular prisms 42a and 42b is eliminated. The polyhedrons are arranged such that prisms 41 and 43 have an opposite c-axis orientation from prisms 42a and 42b or parallelepiped 42. The composite prism formed by smaller prisms 41, 42a, 42b, and 43 is similar to two of the basic structures previously described in conjunction with FIGURE 1 arranged to provide cumulative deflection. The following discussion is directed to the composite prism which includes two 45° right triangular prisms 41 and 43 and a parallelepiped 42. This embodiment eliminates one boundary and is well suited for an array to achieve cumulative deflection as described in conjunction with FIGURE 5.

In operation, incident light beam 10 may pass through the composite prism undeflected if no electric field is applied, provided all polyhedrons have the same index of refraction, or it may be deflected if an electric field is applied to at least one of the polyhedrons. In its undeflected state, extreme ray 10a is incident upon the upper half of first face 44. It then traverses prism 41 to second face 45 where it is redirected toward third face 46. Ray 10a passes through boundaries 49a and 49b, but no deflection occurs. Ray 10a then intercepts face 46 at an angle of 45°. It is directed normal to face 44 by reflective coating 50 on face 46. Reflective coating 51 on face 44 redirects light ray 10a back along the path just described. Thus, ray 10a exits composite prism 40 through the upper half of face 44 along its incident path. Light ray 10b is directed through the composite prism 40 in a similar manner.

When an electric field is applied to entire composite prism 40, deflection occurs at boundaries 49a and 49b. Separate electric fields can also be applied to prisms 41 and 43 and parallelepiped 42 either simultaneously or non-simultaneously. The manner of applying an electric field to an E–O crystal is well known in the art. As extreme ray 10a enters face 44 of composite prism 40, it traverses the prism 41 to face 45 and is directed toward face 46 by reflective coating 47. Light ray 10a is now deflected as it crosses boundaries 49a and 49b. To simplify FIGURE 4, the deflected rays 10c and 10d have been terminated before they intercept face 46. Since the light beam is deflected at boundaries 49a and 49b, ray 10c will intercept face 46 at an angle of incidence other than 45°. Reflective coating 50 on face 46 directs ray 10c toward the lower half of face 44. Ray 10c intercepts face 44 at a direction other than normal. Reflective coating 51 on the lower half of face 44 directs ray 10c back into composite prism 40. Ray 10c is again redirected by reflective coatings 50 and 47 and is further deflected when it passes through boundaries 49a and 49b a second time. Ray 10c is shown exiting composite prism 40 through the upper half of face 44 after being deflected in the manner just described. Ray 10d traverses the prism in a manner similar to ray 10c. That is, it also is deflected each time it crosses boundaries 49a and 49b and it has equal angles of incidence and reflection at reflective coatings 47, 50, and 51. Inside the composite prism, the paths of the two extreme rays have different indices of refraction for nearly their entire traversal. Thus, the O.P.D. between the two extreme rays is maximized. The embodiment of FIGURE 4 substantially reduces the volume of crystal necessary to achieve a given number of resolvable spots and total deflection angle.

It is obvious that only reflective coating 47 is necessary in the embodiment of FIGURE 4. If reflective coatings 50 and 51 were omitted, the light beam 10 would exit through face 46. Similarly, if the embodiment had reflective coatings 47 and 50, but not 51, light beam 12 would exit composite prism 40 through the lower half of face 44. However, the embodiment as shown in FIGURE 4 maximizes the O.P.D. between the two extreme rays. Thus, the number of resolvable spots and total deflection angle is also maximized.

The embodiments illustrated in FIGURES 1 through 4 may utilize many different types of E–O material. For example, material having 3m symmetry, such as lithium niobate ($LiNbO_3$) and lithium tantalate ($LiTaO_3$), can be used in these embodiments. As previously suggested, material having a quadratic E–O effect, such as material having m3m symmetry like lead magnesium niobate ($PbMgNb_2O_9$), may also be used. However, if a linear relationship between the applied electric field and the deflection angle is desired, either a biasing voltage of opposite polarity must be applied to the prisms or an electronic switching device must be used. This electronic switching device in the driving circuit would apply $$+\sqrt{1+E1}$$

on one prism and apply $$-\sqrt{1-E1}$$

on the adjacent prism.

It is obvious that the reflective means in the preceding disclosure do not necessarily have to be reflective coatings. For example, since the total internal reflective angle of $LiNbO_3$ is approximately 42° when bounded by oil, only reflective coating 50 is then necessary. It is also obvious to one skilled in the art that other light reflective means besides reflective coatings, such as mirrors, may be used.

Figure 5:
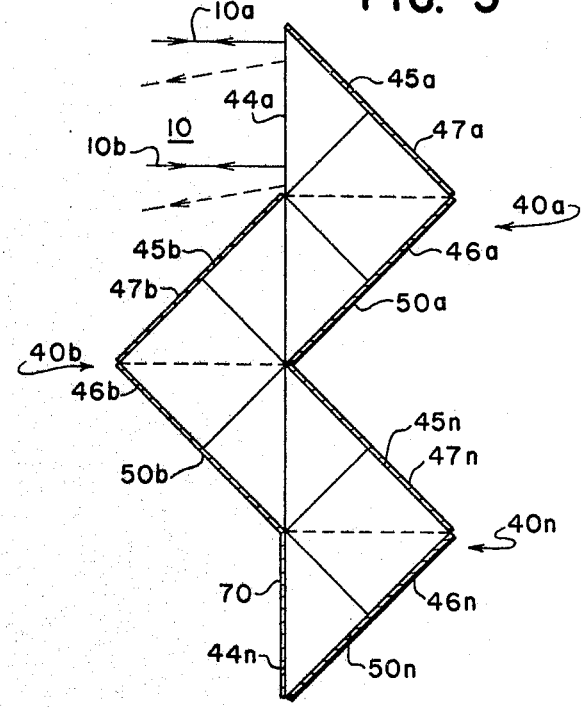
FIGURE 5 is a plurality of the structures shown in FIGURE 4 arranged to provide cumulative deflection.

In FIGURE 5, an array of the basic light deflectors previously described is illustrated. The light deflectors 40a, 40b . . . 40n are arranged so that cumulative deflection is achieved. The light deflectors 40a and 40b are identical to the embodiment of FIGURE 4, except that reflective coating 51 has been omitted. The deflectors are arranged so that light exiting light deflector 40a enters light deflector 40b and is further deflected. After further deflection in the light deflector 40b, the light beam enters the next deflector in the array. The last deflector in the array, deflector 40n, is identical to the embodiment illustrated in FIGURE 4. The reflective coating 70 on one-half of face 44n returns the light beam back through the array to further achieve cumulative deflection.

A light beam generally designated as 10 having extreme rays 10a and 10b is shown entering and exiting face 44a. With no electric field applied, the incident and exiting paths are identical. When an electric field is applied to one of the deflectors in the array, the incident light beam is deflected as it crosses the appropriate boundaries. Deflected rays 10c and 10d are shown exiting the upper half of face 44a. The light beam is directed through the array by reflective coatings 47a, 50a, 47b, 50b, . . . 47n, 50n and 70 on faces 45a, 46a, 45b, 46b, . . . 45n, 46n and 44n as previously described.

Figure 6:
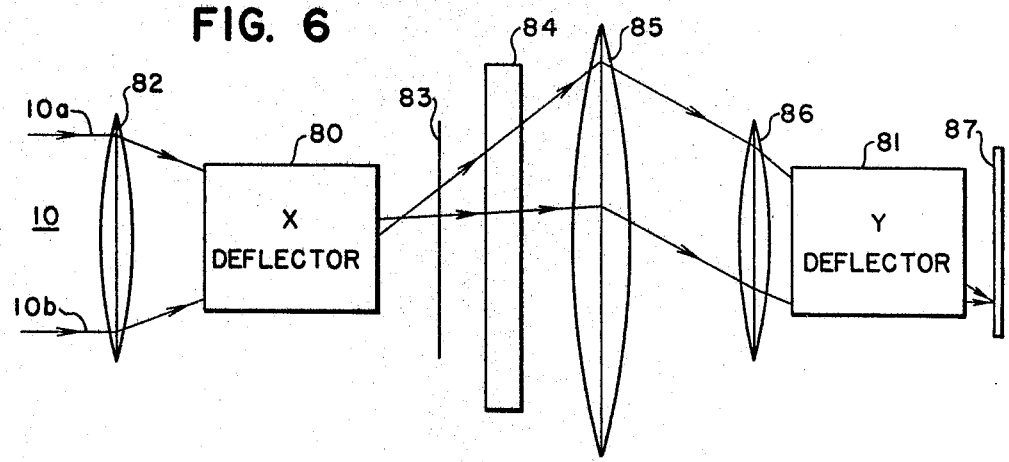
FIGURE 6 is a system utilizing two of the arrays shown in FIGURE 6 to achieve two-dimensional deflection.

FIGURE 6 is a diagrammatical illustration of a system utilizing two of the arrays illustrated in FIGURE 5, to achieve two-dimensional deflection. These two arrays are diagrammatically illustrated as X-deflector 80 and Y-deflector 81.

In operation, light beam 10 having extreme rays 10a and 10b is focused by a lens 82 into the X-deflector 80. The X-deflector then deflects the light beam in one dimension. The plane of polarization of the light leaving the X-deflector is rotated 90° by half-wave plate 83. The half-wave plate 83 may be located at any point between the X- and Y-deflectors. The light is then expanded in the Y direction by a system of cylindrical lenses 84. Converging lens 85 then makes rays 10a and 10b parallel to one another. Rays 10a and 10b then enter converging lens 86. The light then enters Y-deflector 81 where it is deflected in a second dimension. A display means 87 is placed at the focal length of lens 86 and provides a means for displaying a two-dimensional array.

It may be desired to have the number of resolvable spots in the X-direction equal the number of resolvable spots in the Y-direction. To achieve this result, a much higher voltage must be applied to Y-deflector 81 than to X-deflector 80. A way of solving this problem for $LiNbO_3$ is to stack thin prisms together, alternating the direction of the c-axis for successive layers of prisms. It is obvious that the sandwiched electrodes must be transparent at the wave length of the incident light and possess the same refractive index as the E–O crystal.

While this invention has been disclosed with particular reference to the preferred embodiments, it will be understood by those skilled in the art that changes in form and details may be made without departing from the spirit and the scope of the invention. For example, it should be apparent that lenses may be necessary to focus an incident light beam to prevent the light beam from escaping the deflecting prism. Also, a half-silvered mirror or an optical circulator may be necessary to separate the incident and exiting light beam.

The embodiments of the invention in which an exclusive property or right is claimed are defined as follows:

1. A light beam deflector comprising:
    a triangular composite prism including first, second, and third faces and first and second bases, formed by a plurality of polyhedrons composed of electro-optic material wherein:
        said plurality of polyhedrons have electric field dependent indices of refraction,
        each of said plurality of polyhedrons is positioned adjacent one another of said plurality of polyhedrons, thereby forming at least one boundary within said composite prism, and
        said first face is adapted to receive an incident light beam;
    light reflection means adjacent said second face for intercepting a light beam incident upon said first face and transmitted through said composite prism and for redirecting the light beam within said composite prism whereby the incident beam crosses said boundary at least once, and
    means for applying an electric field to said composite prism to change the index of refraction of at least one of said plurality of polyhedrons, whereby the light beam is deflected as it passes through said boundary.

2. The light beam deflector of claim 1, wherein:
    said composite prism is a right triangular composite prism, and
    said light reflection means is adjacent said second and third faces.

3. The light beam deflector of claim 2, wherein said first and third sides are of substantially equal area.

4. The light beam deflector of claim 3, wherein said polyhedrons are first and second right triangular prisms positioned adjacent each other to form said composite prism.

5. The light beam deflector of claim 4, wherein said light reflection means are reflective coatings on said second and third faces.

6. The light beam deflector of claim 5, wherein:
    said first and second prisms are composed substantially of material having a crystallographic c-axis and are positioned with respect to each other to provide opposite c-axis orientation, and
    said electric field means provides said electric field along at least one of said c-axes to change the index of refraction of at least one of said first and second prisms.

7. The light deflector of claim 5, wherein:
    said first and second prisms are composed of substantially the same crystalline material, and
    said electric field means includes separate electrodes on said prisms for applying voltages to said first and second prisms.

8. The light deflector of claim 1, wherein:
    said composite prism is comprised of first and second right triangular prisms and a rectangular parallelepiped having first and second adjacent faces wherein:
        said first and second right triangular prisms are positioned adjacent said first and second faces of said rectangular parallelepiped to form first and second boundaries, and
        said first and second prisms substantially form said first face of said composite prism.

9. The light beam deflector of claim 8 wherein:
    said composite prism is a right triangular prism;
    said second and third faces are of substantially the same area, and
    said light reflective means are adjacent said second and third faces.

10. The light beam deflector of claim 9, wherein said light reflective means is adjacent said second and third faces and a portion of said first face, whereby said first face is partially adapted to transmit a light beam into and out of said composite prism and partially adapted to intercept a light beam within said composite prism and redirect it through said prism back to the portion of said first face adapted to transmit a light beam.

11. The light beam deflector of claim 10, wherein said light reflection means are reflective coatings.

12. The light beam deflector of claim 11, wherein:
    said first and second prisms and said parallelepiped are composed substantially of material having crystallographic c-axes arranged with respect to each other to provide similar c-axis orientations for said first and second prism and an opposite c-axis orietation for said parallelepiped, and
    said electric field means provides said electric field along at least one of said c-axes to change the index of refraction of at least one of said first and second prisms and said parallelepiped.

13. The light beam deflector of claim 11, wherein:
    said first and second prisms and said parallelepiped are composed of substantially the same crystalline material, and
    said electric field means includes separate electrodes on said first and second prisms and said parallelepiped for applying voltages to said first and second prism and said parallelepiped.

14. An array of the light beam deflectors defined in claim 1, wherein a plurality of said deflectors are positioned and arranged adjacent each other to provide cumulative deflection of incident light.

References Cited

UNITED STATES PATENTS 3,400,992  9/1968  McNaney.
3,437,400  4/1969  Rosenberg.

RONALD L. WIBERT, Primary Examiner
PAUL K. GODWIN, Jr., Assistant Examiner

U.S. Cl. X.R.
350—97, 150, 286